Figure 1:
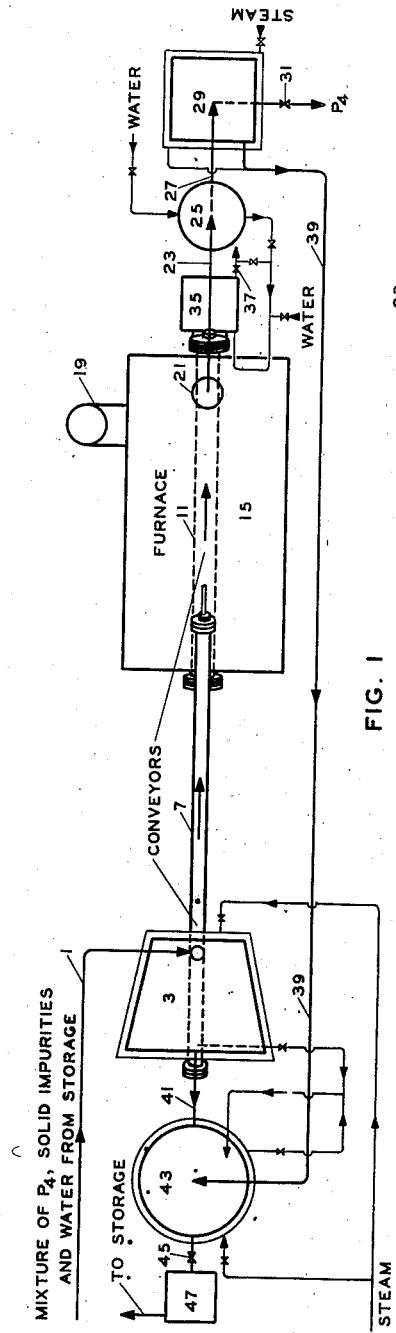

Nov. 8, 1938.                L. H. ALMOND                2,135,486
            SEPARATING ELEMENTAL PHOSPHORUS FROM IMPURITIES
                        Filed Aug. 17, 1937

Lawrence H. Almond
INVENTOR

BY Arthur L. Davis
ATTORNEY

Patented Nov. 8, 1938

2,135,486

UNITED STATES PATENT OFFICE 2,135,486

SEPARATING ELEMENTAL PHOSPHORUS FROM IMPURITIES

Lawrence H. Almond, Nashville, Tenn.

Application August 17, 1937, Serial No. 159,537

3 Claims. (Cl. 23—223)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government for governmental purposes without the payment to me of any royalty thereon.

This invention relates to a process of and apparatus for the separation of elemental phosphorus from crude elemental phosphorus, particularly mixtures of elemental phosphorus and solid impurities.

One of the objects of this invention is to separate elemental phosphorus from mixtures containing the same without converting the elemental phosphorus into phosphorus pentoxide or other phosphorus compounds. Another object of this invention is to separate elemental phosphorus from mixtures containing the same in the form of yellow or white phosphorus without converting this phosphorus into red phosphorus. Other objects of this invention include the provision of a process and apparatus for the continuous and economical separation of elemental phosphorus from mixtures of the same carrying solid impurities.

In the production of elemental phosphorus by the reduction of phosphatic material in a phosphate reduction furnace, whether it be a blast furnace or an electric furnace, there is always produced in the process a certain portion of elemental phosphorus associated with fine particles of material carried over from the phosphate reduction furnace with the gas which presents serious difficulties both from the standpoint of the loss of elemental phosphorus as far as its direct recovery is concerned and the disposal of this material, since the presence of elemental phosphorus therein makes it extremely hazardous. A substantially dry mixture of elemental phosphorus and solid impurities may be obtained either during the separation of dust from the phosphate reduction furnace gas or by the indirect condensation of elemental phosphorus contained in such gas while a mixture carrying a considerable proportion of water is obtained when the elemental phosphorus in a phosphate reduction furnace gas is condensed by a direct condensation with a cooling liquid, such as water. Such mixtures, usually called sludge, may usually contain an average of 50% of elemental phosphorus by weight although the actual amount may vary from a few percent to considerably higher than this value.

It has been proposed to separate the elemental phosphorus from such sludges by burning the elemental phosphorus therefrom in a rotary kiln with or without the presence of other materials, such as rock phosphate. This elemental phosphorus under such circumstances is converted to phosphorus pentoxide or other phosphorus compound depending upon the conditions under which the separation takes place. It has also been proposed to distill the elemental phosphorus from such sludges containing the same. This has only been accomplished in a discontinuous manner which, in addition to not only being expensive, is extremely slow and for the latter reason causes the conversion of a substantial proportion of the white or yellow phosphorus into red phosphorus which is ordinarily undesirable.

I have discovered a process for separating elemental phosphorus from sludges containing the same by continuously feeding the sludge to an enclosed flash distillation zone, by flash distilling continuously the phosphorus and water in the sludge admitted to the zone, by separating the vaporized phosphorus and water from the solid impurities carried by the sludge and by withdrawing the solid impurities from the enclosed flash distillation zone continuously. I have also discovered an apparatus for effectively carrying out this process which is entirely enclosed so that there is no conversion of the elemental phosphorus into phosphorus pentoxide or other phosphorus compounds.

Figure 2:
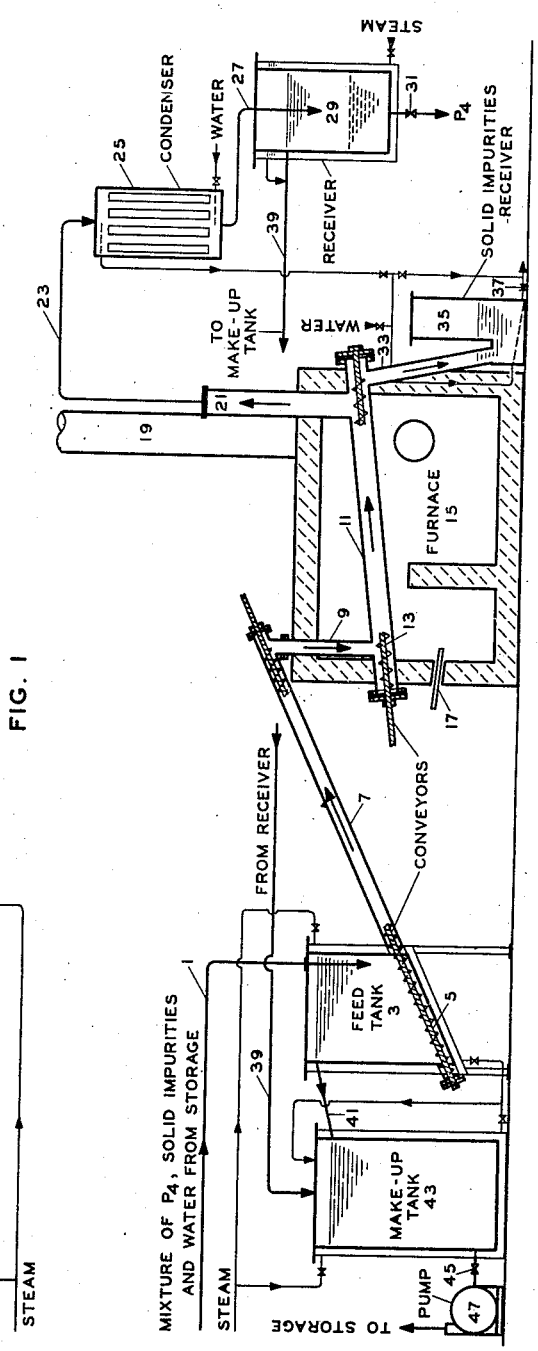

In the accompanying drawing, which forms a part of the specification and wherein reference symbols refer to like parts wherever they occur, Fig. 1 is a diagrammatic plan view of one form of apparatus for the embodiment of my invention, and Fig. 2 is a diagrammatic, vertical, sectional view of the apparatus shown in Fig. 1.

In Fig. 1 and Fig. 2, a mixture containing elemental phosphorus, solid impurities and water from a storage tank (not shown) is delivered through line 1, into steam jacketed feed tank 3. The mixture in the bottom of feed tank 3, is moved upwardly from the troughed bottom of feed tank 3, by means of variable speed drive screw conveyer 5, enclosed external to feed tank 3, by shell 7. The mixture delivered to the upper end of screw conveyer 5, passed through line 9, into the lower end of shell 11, enclosing a second variable speed drive screw conveyer 13, with shell 11, located in furnace 15, equipped with burner 17, and stack 19. The interior of furnace 15, is maintained at a temperature sufficient to maintain the distillation zone within the shell 11, at a temperature sufficient to cause a rapid vaporization of the elemental phosphorus and the water in the mixture delivered into shell 11, and at least at such a rate that both of these materials will be substantially completely vaporized by the time the solid impurities have been conveyed to the upper end of shell 11, by screw conveyer 13. The vaporized elemental phosphorus and water pass from the upper end of shell 11, into separator 21, wherein solid particles carried by the gas stream may fall out due to the reduction of gas velocity obtained in separator 21. The vaporized elemental phosphorus and water pass from separator 21, through vapor line 23, into indirect condenser 25, maintained at a temperature not lower than the melting point of elemental phosphorus. The condensed elemental phosphorus and water pass from condenser 25, through line 27, into receiver 29, jacketed with hot water to maintain the elemental phosphorus in the bottom of the receiver molten. The molten phosphorus in the bottom of receiver 29, is withdrawn through valve line 31, to storage. The solid impurities moved by the screw conveyer 13, to the upper end of shell 11, pass through line 33, which is water sealed into receiver 35. The solid impurities delivered to receiver 35, are intermingled with water, either the condenser water from condenser 25, or a separate water supply, and the mixture is withdrawn continuously or discontinuously through valve line 37. The water separated in receiver 29, passes through line 39, and any water separating to the top of feed tank 3, passes through overflow line 41, into steam jacketed make-up tank 43. This water which always carries a trace of elemental phosphorus passes through valve line 45, into pump 47, from which it is delivered to the storage tank (not shown) which also serves as a sludge mixing tank.

It is evident that there are numerous factors which will influence conditions for the most satisfactory operation of my invention, the actual limits of which cannot be established except by a detailed study of each set of raw materials and finished products involved.

The original sludge may be either a mixture of elemental phosphorus, phosphorus and solid impurities or a mixture of elemental phosphorus, solid impurities and water. When the original material is a substantially dry mixture of elemental phosphorus and solid impurities, it is necessary to add water to this mixture, in an amount at least sufficient to form a semi-fluid mixture which is to be supplied as the feed material. Likewise if the water content of such a wet mixture is low it is necessary to add additional water.

The feed is advanced positively through a distillation zone heated in such a manner that the elemental phosphorus and water contained therein is flash distilled or at least rapidly vaporized and all so vaporized by the time the solid impurities have passed through the distillation zone. This movement of the feed may be conveniently accomplished by a screw conveyer, although any other positive means for effecting the same or equivalent results are equally suitable. It has been found desirable in certain instances to charge the feed material to the screw conveyer passing through the furnace by means of another screw conveyer feeding directly from the bottom of the feed tank in such a manner that a partial adjustment of the water content of the feed and a more regular charging of the feed is obtained with the discharge from this conveyer feeding into the conveyer passing through the distillation zone. In any event, the respective conveying means should have a variable speed in order that adequate adjustment may be made according to the variations in the composition of the feed and the circumstances under which the separation of the elemental phosphorus and water from the mixture are carried out.

The enclosed distillation zone may be heated by locating it within a suitable designed furnace, either fuel fired or electrically heated. The temperature within the distillation zone should ordinarily be maintained at 750° to 800° F.

The vaporized elemental phosphorus and the water are separated from the non-volatile solid impurities either in the distillation zone or adjacent thereto. This may be accomplished by having an appropriate space above the screw conveyer passing through the distillation zone in order that the gases may pass directly to the outlet of this zone at a reduced vapor velocity or by an appropriate design of the distillation zone with a separate passage along the top of the zone to accomplish substantially the same result. In some instances, it may be more desirable to have the screw conveyer in the distillation zone fit in more closely with its shell and provide a separator for accomplishing the separation of traces of solid impurities carried by the vaporized material.

The vaporized phosphorus and water are condensed and the constituents of the condensate separated.

The solid impurities which remain on passing the feed through the distillation zone are discharged into a receiver, mixed with water to form a sludge and disposed as such. The entire process is carried out in an enclosed apparatus to prevent oxidation of the elemental phosphorus. It will be noted from the drawing that the feed device is sealed from the atmosphere and that the outlet carrying residue of solid impurities is also sealed against the admission of atmospheric oxygen.

Water which has been in contact with elemental phosphorus usually carries traces of the later and must be handled with care. In this instance, water separating from the feed in the feed tank and water condensed along with the elemental phosphorus is run to a make-up tank and used as a source of water for admixing with the sludge as required. Some of this water may, however, have to be withdrawn from the system as the circumstances require.

The residual solid impurities may be removed from the receiver continuously or discontinuously, either by direct application of a water jet or by continuous passage of a flow of water through the receiver, such as may be available as the condenser water discharged from the condenser used to condense the vaporized elemental phosphorus and water.

It will be seen, therefore, that this invention actually may be carried out by the modification of certain details without departing from its spirit or scope.

I claim:

1. Process of separating elemental phosphorus from a mass of elemental phosphorus and solid impurities, such as obtained by separating dust from phosphate reduction furnace gas or by indirect condensation of phosphorus from phosphate reduction furnace gas, which comprises, mixing at least a sufficient quantity of water with the mass to form a semi-fluid mixture; feeding the mixture continuously into an enclosed flash distillation zone maintained at approximately 750° to 800° F.; flash distilling the phosphorus and water in the mixture continuously; separating the vaporized phosphorus and water from the solid impurities continuously; condensing the phosphorus and water; and withdrawing the solid impurities from the enclosed flash distillation zone continuously.

2. Process of separating elemental phosphorus from a mixture of elemental phosphorus, solid impurities and water, such as obtained by the direct condensation of phosphorus from phosphate reduction furnace gas, which comprises, adjusting the water content of the mixture until it is semi-fluid; feeding the mixture continuously into an enclosed flash distillation zone maintained at approximately 750° to 800° F.; flash distilling the phosphorus and water in the mixture continuously; separating the vaporized phosphorus and water from the solid impurities continuously; and withdrawing the solid impurities from the enclosed flash distillation zone continuously.

3. In the process of separating elemental phosphorus from a mixture comprising elemental phosphorus, solid impurities and water, the steps which comprise, adjusting the water content of the mixture until it is semi-fluid; flash distilling the phosphorus and water continuously in an enclosed flash distillation zone maintained at least at a temperature sufficiently high to flash distill the phosphorus and water in the mixture admitted to the zone; separating the vaporized phosphorus and water from the solid impurities continuously; and withdrawing the solid impurities from the enclosed flash distillation zone continuously.

LAWRENCE H. ALMOND.